United States Patent
Kwon

(10) Patent No.: US 10,158,916 B2
(45) Date of Patent: Dec. 18, 2018

(54) DISPLAY DEVICE, DISPLAY DEVICE CONTROL METHOD, AND SERVER

(71) Applicant: SAMSUNG ELECTRONICS CO., LTD., Suwon-si, Gyeonggi-do (KR)

(72) Inventor: Bo-kyun Kwon, Suwon-si (KR)

(73) Assignee: SAMSUNG ELECTRONICS CO., LTD., Suwon-si, Gyeonggi-do (KR)

(*) Notice: Subject to any disclaimer, the term of this patent is extended or adjusted under 35 U.S.C. 154(b) by 0 days.

(21) Appl. No.: 15/314,340

(22) PCT Filed: May 21, 2015

(86) PCT No.: PCT/KR2015/005071
§ 371 (c)(1),
(2) Date: Nov. 28, 2016

(87) PCT Pub. No.: WO2015/182919
PCT Pub. Date: Dec. 3, 2015

(65) Prior Publication Data
US 2017/0201797 A1    Jul. 13, 2017

Related U.S. Application Data

(60) Provisional application No. 62/003,777, filed on May 28, 2014.

(30) Foreign Application Priority Data

Jul. 17, 2014  (KR) .................. 10-2014-0090223

(51) Int. Cl.
*H04N 7/16* (2011.01)
*H04N 21/4623* (2011.01)
(Continued)

(52) U.S. Cl.
CPC ......... *H04N 21/4623* (2013.01); *H04L 67/10* (2013.01); *H04N 21/25808* (2013.01);
(Continued)

(58) Field of Classification Search
CPC combination set(s) only.
See application file for complete search history.

(56) References Cited

U.S. PATENT DOCUMENTS

| 7,013,288 | B1 | 3/2006 | Reifel et al. |
| 8,577,334 | B1* | 11/2013 | Smith ................ H04W 12/08 |
| | | | 455/410 |

(Continued)

FOREIGN PATENT DOCUMENTS

| CN | 101291249 | 10/2008 |
| CN | 102833602 | 12/2012 |

(Continued)

OTHER PUBLICATIONS

International Search Report for PCT/KR2015/005071, dated Aug. 18, 2015, 4 pages.
(Continued)

*Primary Examiner* — Mulugeta Mengesha
(74) *Attorney, Agent, or Firm* — Nixon & Vanderhye, P.C.

(57) ABSTRACT

Disclosed is a display apparatus including: a display; a processor configured to process an image to be displayed on the display; a communicator configured to communicate with a server that provides content data; and a controller configured to control the processor and the communicator to display an input image provided for allowing a user to input an activation code, send the server the activation code input through the input image so that the display apparatus can be registered to the server, and receive and process the content data provided corresponding to the activation code from the (Continued)

server so that a content image can be displayed based on the content data.

14 Claims, 11 Drawing Sheets

(51) Int. Cl.
| | |
|---|---|
| *H04N 21/2668* | (2011.01) |
| *H04L 29/08* | (2006.01) |
| *H04N 21/431* | (2011.01) |
| *H04N 21/475* | (2011.01) |
| *H04N 21/258* | (2011.01) |
| *H04N 21/422* | (2011.01) |
| *H04N 21/441* | (2011.01) |
| *H04N 21/443* | (2011.01) |
| *H04N 21/6547* | (2011.01) |
| *H04N 21/658* | (2011.01) |
| *H04N 21/6587* | (2011.01) |
| *H04N 21/81* | (2011.01) |

(52) U.S. Cl.
CPC . *H04N 21/25866* (2013.01); *H04N 21/25875* (2013.01); *H04N 21/2668* (2013.01); *H04N 21/42202* (2013.01); *H04N 21/4312* (2013.01); *H04N 21/4316* (2013.01); *H04N 21/441* (2013.01); *H04N 21/4432* (2013.01); *H04N 21/4753* (2013.01); *H04N 21/6547* (2013.01); *H04N 21/6582* (2013.01); *H04N 21/6587* (2013.01); *H04N 21/812* (2013.01)

(56) References Cited

U.S. PATENT DOCUMENTS

| 9,329,746 | B2 | 5/2016 | Lee et al. |
| 2006/0022820 | A1 | 2/2006 | Martin et al. |
| 2006/0109381 | A1* | 5/2006 | Kim ................... H04N 5/44504 348/569 |
| 2010/0082514 | A1* | 4/2010 | Yamazaki ............. H04N 7/163 706/46 |
| 2011/0055577 | A1* | 3/2011 | Candelore ................ H04L 9/32 713/176 |
| 2011/0166968 | A1* | 7/2011 | Houng ..................... H04N 5/44 705/30 |
| 2011/0185040 | A1* | 7/2011 | Schmidt ............ G06F 17/30905 709/217 |
| 2012/0154386 | A1* | 6/2012 | Nagara .................. G02B 27/26 345/419 |
| 2013/0212487 | A1 | 8/2013 | Cote |
| 2014/0040959 | A1* | 2/2014 | Oyman .............. H04N 21/6131 725/62 |
| 2014/0137223 | A1 | 5/2014 | Wagner et al. |

FOREIGN PATENT DOCUMENTS

| EP | 1 883 241 | 1/2008 |
| KR | 10-2008-0046851 | 5/2008 |
| KR | 10-2010-0011020 | 2/2010 |
| KR | 10-2011-0020453 | 3/2011 |
| KR | 10-2011-0059423 | 6/2011 |
| KR | 10-2011-0087651 | 8/2011 |
| WO | WO 2008/063028 | 5/2008 |
| WO | 2013/100974 | 7/2013 |

OTHER PUBLICATIONS

Extended Search Report dated Nov. 14, 2017 in counterpart European Patent Application No. 15799675.2.
Office Action dated Oct. 24, 2017 in counterpart Chinese Patent Application No. 201510282076.2.
Anonymous: "Wie funktioniert der 1&1 Startcode?—Mikrocontroller. net", May 6, 2013, XP055419730.
Anonymous: "TR-069—Wikipedia, the free encyclopedia", Feb. 13, 2014, XP055419713.

* cited by examiner

| ACTIVATION CODE | VALIDITY CHECK INFORMATION | | | |
| --- | --- | --- | --- | --- |
| | EFFECTIVE INSTALLATION NUMBER | REGISTRATION EXPIRY DATE | INSTALLATION REGION | TOTAL INSTALLATION NUMBER |
| 6386719 | 5 | 2014-07-30 | A | 3 |
| 7512332 | 4 | 2014-08-06 | B | 4 |
| ⋮ | ⋮ | ⋮ | ⋮ | ⋮ |

DISPLAY DEVICE, DISPLAY DEVICE CONTROL METHOD, AND SERVER

This application is the U.S. national phase of International Application No. PCT/KR2015/005071 filed 21 May 2015, which designated the U.S., which claims priority to U.S. Provisional Application No. 62/003,777 filed 28 May 2014, and KR Patent Application No. 10-2014-0090223 filed 17 Jul. 2014, the entire contents of each of which are hereby incorporated by reference.

TECHNICAL FIELD

Apparatuses and methods consistent with the exemplary embodiments relate to a display apparatus which can receive a content data service from a service provider and display a content image based on this content data, a control method thereof and a server, and more particularly to a display apparatus which is convenient for a user to receive a service customized to him/her from a service provider, a control method thereof and a server.

BACKGROUND ART

An image processing apparatus, which processes image data to be finally displayed as an image, is classified into a type that basically includes a display panel and displays an image by itself based on a processed image signal, and a type that does not have a panel and processes and outputs an image signal to another apparatus. In particular, the former type is called a display apparatus.

The display apparatus processes an image signal/image data received from an exterior or stored in an interior through various processes and displays and image on a display panel or a screen. The display apparatus may be variously achieved by a television (TV), a monitor, a portable media player, etc. in accordance with its use. As a human's life pattern is diversified and segmented, the use of the display apparatus has been not limited to just a personal device but expanded in more various industrial or service aspects.

As an example of the display apparatus, there is a digital signage installed indoor or outdoor to display an advertising content image. For example, the digital signage may be installed in a shop that carries a certain kind of products so that menus for the product the shop sells can be guided or various products can be advertised. Such a digital signage system may be achieved by installing one or more display apparatuses in a shop, in which the display apparatus receives a content from a server or host of a service provider and displays a content image. Since the digital signage has a purpose of advertising the product, the content mainly includes contents specialized in accordance with the shops.

DISCLOSURE OF INVENTION

In accordance with an embodiment of the present invention, there is provided a display apparatus including: a display; a processor configured to process an image to be displayed on the display; a communicator configured to communicate with a server that provides content data; and a controller configured to control the processor and the communicator to display an input image provided for allowing a user to input an activation code, send the server the activation code input through the input image so that the display apparatus can be registered to the server, and receive and process the content data provided corresponding to the activation code from the server so that a content image can be displayed based on the content data. Here, the content data provided by the server may be stored to correspond to a user of the display apparatus in the server, and the controller may receive the content data provided corresponding to a user of the registered display apparatus. Thus, the display apparatus is convenient to provide a content service customized to a user from the server.

Here, the content data may be sent from the server in accordance with schedule information for designating a time zone where the content data is provided to the display apparatus. Thus, the display apparatus properly displays a content image of each content desired by a user in accordance with a corresponding time zone.

The controller may further receive layout information for designating a layout where the content image is displayed, and control the display to display the content image based on the layout information. Thus, the display apparatus displays a content image in accordance with layout information.

Here, the layout information may include at least one template for designating a layout of displaying and arranging the content image.

Here, the controller may send installation environment information about an installation environment of the display apparatus together with the activation code to the server so that the server can select one of a plurality of templates based on the installation environment of the display apparatus, and control the content image to be displayed based on the selected template. Thus, the display apparatus receives the layout suitable corresponding to the installation environment of the corresponding display apparatus.

Further, the server may register the display apparatus if it is determined that validity of the activation code is validated when the validity of the activation code is checked based on validity check information. Thus, it is possible to raise security when the registration is based on the activation code.

The validity of the activation code may be validated if registrable number of display apparatuses using the activation code does not exceed a preset value. Thus, when a display apparatus tries to do the registration with the activation code by exceeding the registrable number contracted by a user, this display apparatus is prevented from registration.

Further, the validity of the activation code may be validated if a point of time of receiving the activation code in the server has not passed a preset date. Thus, it is possible to prevent the registration of the display apparatus at a point of time that has passed the designated date.

The validity of the activation code may be validated if an installation region of the display apparatus sending the activation code is the same as a preset region. Thus, it is possible to prevent the registration of the display apparatus installed in a region other than the regions contracted by a user.

The controller may receive an apparatus setting of display apparatus designated based on an installation environment from the server by sending installation environment information about the installation environment of the display apparatus together with the activation code to the server, and control the content image to be displayed based on the received apparatus setting. Thus, the content image provided by the server is properly displayed on the display apparatus in consideration of the installation environment of each display apparatus.

Here, the installation environment information may include an installation position and an installation layout of the display apparatus.

The apparatus setting of display apparatus may include at least one of a time zone of the installation region of the display apparatus, information about whether to additionally display an advertising image, information whether to cut off the display apparatus from displaying an external input signal, and a rotated angle of the content image.

The controller may proceed with an initial setting service for setting a use environment of the display apparatus when the display apparatus is first turned on, and acquire the installation environment information in accordance with the initial setting service.

The controller may control the input image to be displayed when the network setting is completed in the initial setting service. Thus, the display apparatus is accessible to the server, and the acquired information to the server at the network setting.

Further, the controller may receive setting information of device environment including display setting of the content image from the server in response to the transmission of the activation code, and perform the apparatus setting based on the setting information of the apparatus environment. Thus, the display apparatus can display a content image or perform the apparatus setting in accordance with designation of the server.

Further, the content data may be not provided from the server to the display apparatus if the display apparatus is not registered to the server. Thus, it is possible to prevent the server from providing the content data to the display apparatus that is not registered by the activation code.

In accordance with an embodiment of the present invention, there is provided a method of controlling a display apparatus, the method including: accessing a server that provides content data; displaying an input image provided for allowing a user to input an activation code; sending the server the activation code input through the input image so that the display apparatus can be registered to the server; and receive and process the content data provided corresponding to the activation code from the server so that a content image can be displayed based on the content data. Here, the content data provided by the server may be stored to correspond to a user of the display apparatus in the server, and the displaying the content image may include receiving the content data provided corresponding to a user of the registered display apparatus. Thus, the display apparatus is convenient to provide a content service customized to a user from the server.

Here, the content data may be sent from the server in accordance with schedule information for designating a time zone where the content data is provided to the display apparatus. Thus, the display apparatus properly displays a content image of each content desired by a user in accordance with a corresponding time zone.

The displaying the content image may further include receiving layout information for designating a layout where the content image is displayed, and displaying the content image based on the layout information. Thus, the display apparatus displays a content image in accordance with layout information.

Here, the layout information may include at least one template for designating a layout of displaying and arranging the content image.

Here, the transmitting the activation code to the server may include sending installation environment information about an installation environment of the display apparatus together with the activation code to the server so that the server can select one of the plurality of templates based on the installation environment of the display apparatus, and the displaying the content image may include displaying the content image based on the selected template. Thus, the display apparatus receives the layout suitable corresponding to the installation environment of the corresponding display apparatus.

Further, the server may register the display apparatus if it is determined that validity of the activation code is validated when the validity of the activation code is checked based on validity check information. Thus, it is possible to raise security when the registration is based on the activation code.

The validity of the activation code may be validated if registrable number of display apparatuses using the activation code does not exceed a preset value. Thus, when a display apparatus tries to do the registration with the activation code by exceeding the registrable number contracted by a user, this display apparatus is prevented from registration.

Further, the validity of the activation code may be validated if a point of time of receiving the activation code in the server has not passed a preset date. Thus, it is possible to prevent the registration of the display apparatus at a point of time that has passed the designated date.

The validity of the activation code may be validated if an installation region of the display apparatus sending the activation code is the same as a preset region. Thus, it is possible to prevent the registration of the display apparatus installed in a region other than the regions contracted by a user.

The transmitting the activation code to the server may include receiving an apparatus setting of display apparatus designated based on an installation environment from the server by sending installation environment information about the installation environment of the display apparatus together with the activation code to the server, and the displaying the content image may include displaying the content image based on the received apparatus setting. Thus, the content image provided by the server is properly displayed on the display apparatus in consideration of the installation environment of each display apparatus.

Here, the installation environment information may include an installation position and an installation layout of the display apparatus.

The apparatus setting of display apparatus may include at least one of a time zone of the installation region of the display apparatus, information about whether to additionally display an advertising image, information whether to cut off the display apparatus from displaying an external input signal, and a rotated angle of the content image.

Further, the displaying the image may include receiving setting information of device environment including display setting of the content image from the server in response to the transmission of the activation code, and performing the apparatus setting based on the setting information of the apparatus environment. Thus, the display apparatus can display a content image or perform the apparatus setting in accordance with designation of the server.

In accordance with an embodiment of the present invention, there is provided a server including a communicator configured to communicate with one or more display apparatuses; a storage configured to store content data prepared corresponding to the activation code; and a controller configured to register the display apparatus if receiving the activation code from the display apparatus, and control the content data stored in the storage to be transmitted to the registered display apparatus so that the content data prepared corresponding to the activation code can be displayed as a content image. Thus, the server is convenient to provide a content service customized to a user for the display apparatus.

BEST MODE

Below, exemplary embodiments will be described in detail with reference to accompanying drawings. In the following exemplary embodiments, only elements directly related to the exemplary embodiment will be described, and descriptions about the other elements will be omitted. However, it will be appreciated that the elements, the descriptions of which are omitted, are not unnecessary to realize the apparatus or system according to the exemplary embodiments.

Figure 1:
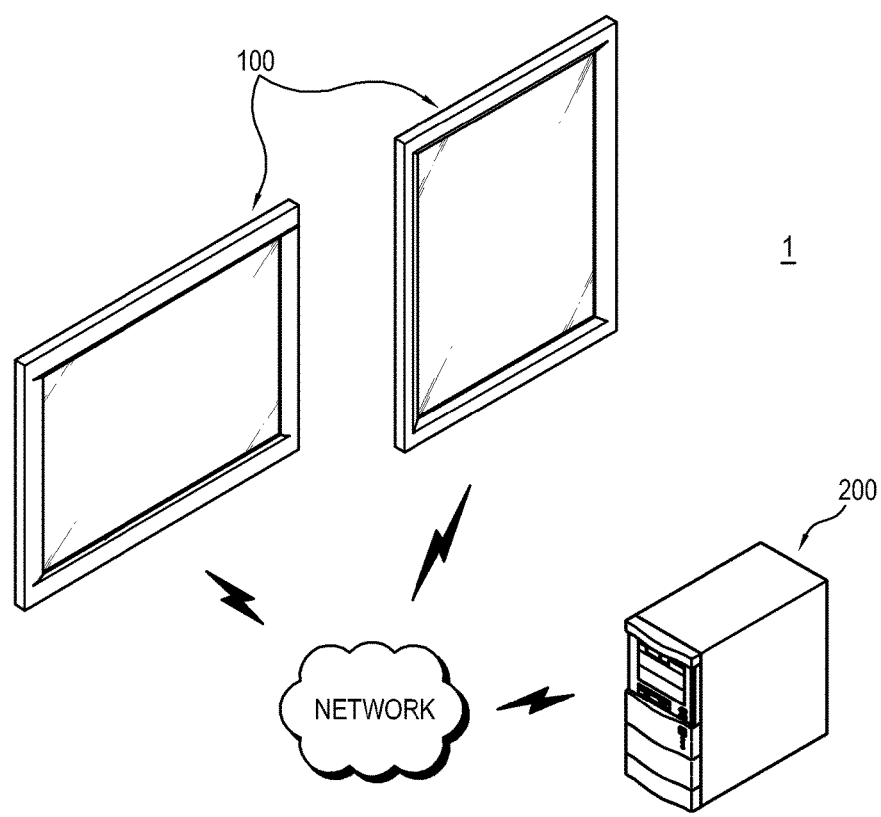
FIG. 1 shows an example of a system according to an exemplary embodiment.

FIG. 1 shows an example of a system 1 according to an exemplary embodiment;

As shown in FIG. 1, the system 1 according to this exemplary embodiment is a digital advertising system to be installed in a shop that carries a certain product. However, this exemplary embodiment is nothing but an example of the system 1, and may vary through workshop modification without departing from the scope of the invention.

For example, the system 1 in this exemplary embodiment includes one or more display apparatuses 100 installed inside a burger barn, and a server 200 connected through a network to communicate with the display apparatus 100. However, the kind of shop, the number of display apparatuses 100, the installation positions and installation layout of the display apparatus 100, etc. may vary without being limited to this exemplary embodiment. Further, the display apparatus 100 in this exemplary embodiment is directly connected to the server 200 through the network, but not limited thereto. For example, a plurality of display apparatus 100 installed in the shop may form an intranet and connect with the server 200 through a router or a gateway.

The display apparatus 100 processes content data received from the server 200 and displays a content image. Even through the burger barn is the same kind of shop, the content images have to be varied depending on shops and time zones, respectively. For example, a hamburger may be varied in menu or price depending on time zones such as morning, lunch, afternoon, evening and night, or may be varied in menu depending on regions.

Therefore, the server 200 needs to transmit a content prepared for each time zone to the corresponding display apparatus 100, in accordance with preset time schedules. Further, the server 200 has to offer a content in accordance with a time zone of a region where the display apparatus 100 is installed.

Such a setting of a schedule for a content is achieved as a service provider constructs contents and schedules of reflecting a contract with a user, e.g., a manager of a shop, if s/he confirms desired contents and schedules through the contract with the service provider.

According to another exemplary embodiment, a user installs one or more display apparatuses 100 in a shop after making a contract, and connects the display apparatuses 100 and the server 200 to communicate each other through a network setting for each display apparatus 100 and an address setting for the server 200. When the display apparatus 100 accesses the server 200, the service provider manually inquire about identification information of the corresponding display apparatus 100 and user information, and performs settings of contents and schedules and settings of functions customized to a user in accordance with the contract contents. Further, the service provider registers the display apparatus 100 to an apparatus group of a user and provides contents to the display apparatus 100 in accordance with settings.

However, the construction of the system 1 based on the method according this exemplary embodiment is delayed or needs to call the service provider, since the service provider or manager for operating/controlling the server 200 has to manually classify or approve the display apparatus 100 when the display apparatus 100 is registered to the server 200.

Accordingly, the present exemplary embodiment is devised to more easily register the display apparatus 100 to the server 200 and provide the display apparatus 100 with a content service customized to a user from the server 200, which will be described later.

Figure 2:
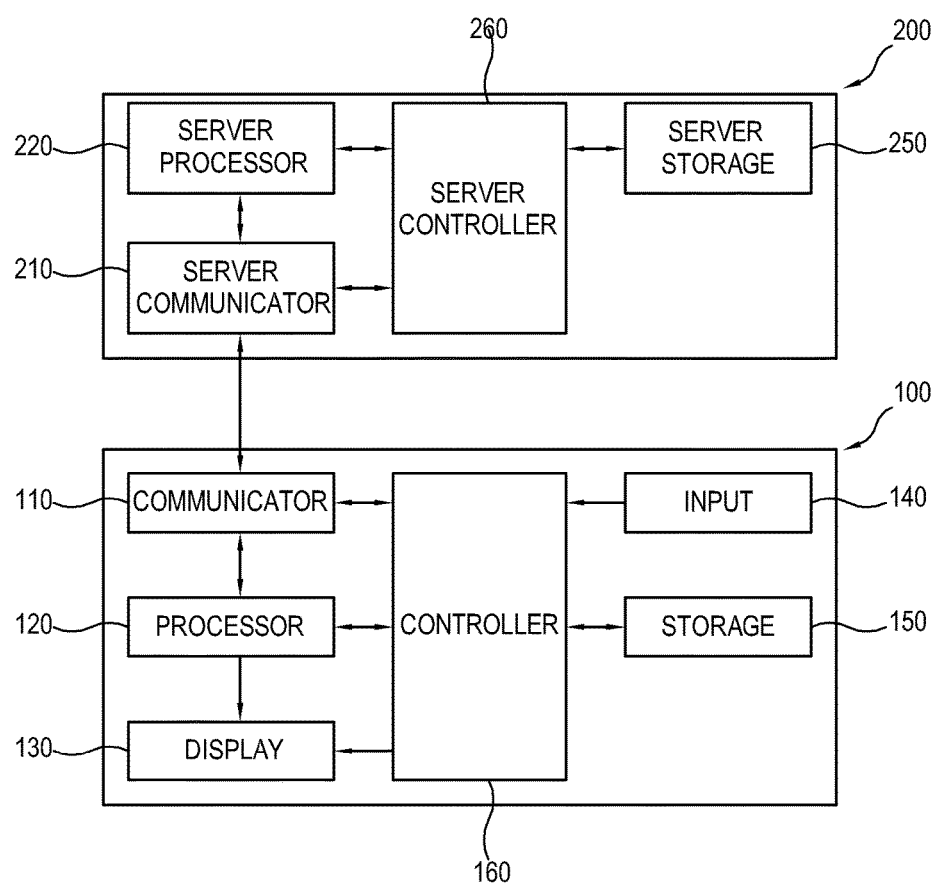
FIG. 2 is a block diagram of a display apparatus and a server in the system of FIG. 1.

Below, the configurations of the display apparatus 100 and the server 200 will be described with reference to FIG. 2. In FIG. 2, the configurations of the display apparatus 100 and the server 200 show only elements directly related to this exemplary embodiment, and it is therefore obvious that additional elements are needed when the display apparatus 100 and the server 200 are materialized as actual products.

FIG. 2 is a block diagram of the display apparatus 100 and the server 200 in the system of FIG. 1;

As shown in FIG. 2, the display apparatus 100 includes a communicator 110 which communicates with an exterior to transmit and receive data/a signal; a processor 120 which processes the data received in the communicator 110 in accordance with preset processes; a display 130 which displays an image based on image data processed by the processor 120; an input 140 which receives a user's input; a storage 150 which stores data, and a controller 160 which controls overall operations of the display apparatus 100 including the processor 120. If the system 1 includes a plurality of display apparatuses 100, each of the display apparatuses 100 may be achieved by the same display apparatus 100 described in this embodiment.

Further, the server 200 includes a server communicator 210 which communicates with one or more display apparatuses 100; a server processor 220 which implements processing operations of the server 200; a server storage 250 which stores data; and a server controller 260 which controls overall operations of the server 200 including the server processor 220.

The communicator 110 transmits and receives data through a network so that the display apparatus 100 can interactively communicate with the server 200. The communicator 110 accesses the server 200 through a wired/wireless wide area network in accordance with preset communication protocols. The communicator 110 may be achieved by an assembly of connection ports or connection modules respectively corresponding to communication standards. Thus, a protocol for connection or an external device to be connected is not limited to one kind or type. The communicator 110 may be built-in the display apparatus 100, and the whole or a part thereof may be additionally installed in the display apparatus 100 in the form of add-on or dongle.

The communicator 110 may transmit and receive a signal based on an individual communication protocol for each connected device. In case of image data, the communicator 110 may transmit and receive a signal based on, radio frequency (RF), composite/component video, super video, SCART, high definition multimedia interface (HDMI), displayport, unified display interface (UDI), a wireless HD, or the like standards.

The processor 120 performs various processes with regard to data/a signal received in the communicator 110. If the communicator 110 receives image data, the processor 120 applies an image processing process to the image data, and outputs the processed image data to the display 130 so that an image based on the image data can be displayed on the display 130. If a signal received in the communicator 110 is a broadcast signal, the processor 120 extracts video, audio and supplementary data from a broadcast signal of a certain tuned channel, and adjusts an image based on the video signal to a preset resolution, thereby displaying the image on the display 130.

The kind of image processing processes performed by the processor 120 may for example include decoding corresponding to various image formats of the image data, de-interlacing for converting interlaced-type image data into progressive-type one, scaling for adjusting the image data to have a preset resolution, noise reduction for improving image quality, detail enhancement, frame refresh rate conversion, etc. without limitation.

The processor 120 may perform various processes in accordance with the kind and properties of data, and therefore the process of the processor 120 is not limited to the video processing process. Further, the data that can be processed by the processor 120 is not limited to data received in the communicator 110. For example, if a user's speech is input to the input 140, the processor 120 may process the speech in accordance with preset audio processing processes. In addition, if a user's gesture is sensed by the input 140, the processor 120 may process the sensed result in accordance with preset gesture processing processes.

However, the foregoing functions of the processor 120 may be partially excluded or restricted in consideration of the use, security or the like of the display apparatus 100. For example, if the display apparatus 100 is used as digital signage, the function of processing the broadcast, the function of processing the speech/gesture, and the like functions may be unnecessary.

The processor 120 may be achieved by an image processing board (not shown) formed by mounting a system-on-chip (SoC), where various functions corresponding to such functions are integrated, or individual chip-sets for independently performing the respective processes to a printed circuit board. Thus, the display apparatus 100 includes the built-in processor 120.

The display 130 displays an image based on the image signal/the image data processed by the processor 120. The display 130 may for example be achieved by liquid crystal, plasma, a light emitting diode (LED), an organic light-emitting diode (OLED), a surface-conduction electron-emitter, a carbon nano-tube (CNT), nano-crystal, or the like various displays, without limitation.

The display 130 may include additional elements in accordance with its types. For example, if the display 130 is achieved by the liquid crystal, the display 130 includes a liquid crystal display (LCD) panel (not shown), a backlight unit (not shown) for emitting light to the LCD panel, and a panel driver (not shown) for driving the panel (not shown).

The input 140 sends the controller 160 a variety of preset control commands or information in response to a user's operation or inputs. The input 140 sends the controller 160 various informationization events generated by a user in accordance with a user's intention and transmits it to the controller 160. The input 140 may be achieved in various forms for generating input information from a user. For example, the input 140 may include a key/a button installed outside the display apparatus 100, a remote controller provided remotely and separately from a main body of the display apparatus 100 and communicating with the communicator 110, or a touch screen integrated with the display 130.

The storage 150 stores a variety of data under control of the controller 160. The storage 150 is achieved by a flash-memory, a hard-disc drive or the like nonvolatile memory to preserve data regardless of supply of system power. The controller 160 is accessed by the processor 120 or the controller 160 and performs reading, writing, editing, deleting, updating or the like with regard to data.

The controller 160 is achieved by a central processing unit (CPU), and controls operations of the display apparatus 100 in response to occurrence of a certain event. For example, the controller 160 controls the processor 120 to process image data of a certain content and the display 130 to display an image based on the processed image data when the image data is received in the communicator 110. Further, the controller 160 controls elements such as the processor 120 to perform an operation previously set corresponding to the corresponding event if a user's input event occurs through the input 140.

Below, the construction of the system 1 will be described.

The service provider may provide the display apparatus 100 packaged with a license of a content service corresponding to customer information acquired from a user. A user first purchases such a packaged license from the service provider, and then gives the service provider the customer information related to a shop where the display apparatus 100 is installed and him/her who uses the display apparatus 100 when entering into a purchase contract. The customer information contains a region where the shop is located, a time zone of the corresponding region, the kinds of items that the shop carries, contents desired by a user, a time zone in which the contents are provided, the number of display apparatuses 100 to be installed, whether to put an advertisement, and the like a user's intention and taste related to content provision.

The service provider builds a database, which involves contents customized to a user and a schedule for providing the contents, based on the acquired customer information, and stores the database in the server storage 250.

Figure 3:
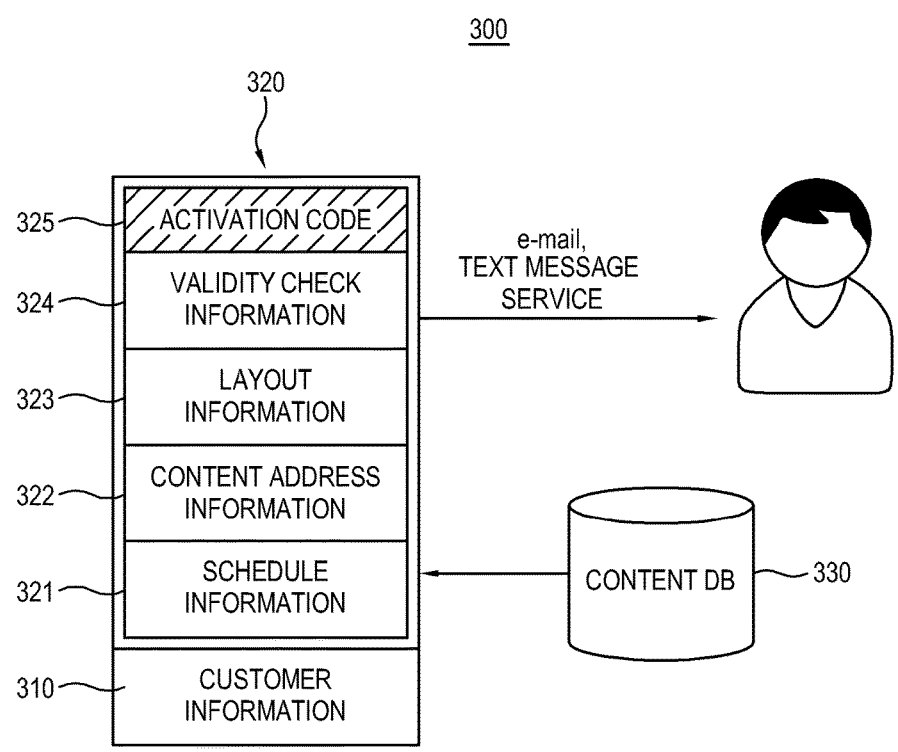
FIG. 3 shows an example of a database containing records corresponding to customer information in the server of FIG. 2.

FIG. 3 shows an example of a database 300 containing records 320 corresponding to customer information 310.

As shown in FIG. 3, the database 300 includes records 320 corresponding to the customer information 310 acquired from a user. The records 320 includes schedule information 321 provided for designating contents corresponding to time zones, content address information 322 provided for retrieving the content data designated in the schedule information 321 from a content database (DB) 330 in which a variety of content data is stored, and layout information 323 provided for designating a display layout of contents.

In the schedule information 321, contents to be provided are designated corresponding to the time zones. For example, in case of a burger barn where a product menu is basically included in the content data, the product menu may be varied in product and price depending on time zones such as morning, lunch and evening and night. In the schedule information 321, it is designated what content data is provided at which time zone.

In the content address information 322, the contents designated in the schedule information 321 are designated to have addresses in the content DB 330. The content DB 330 may be stored in the server 200 as a database of directly containing the content data, or may be stored in another separate server. The content data may be directly contained in the records 320. However, for convenience of managing the records 320, the content data is built as a separate database, and the records 320 contain only the addresses of the content data.

In the layout information 323, it is designated what layout is used for displaying the content data in the display apparatus 100. For example, the content image has to be differently displayed in accordance with whether the display apparatus 100 is installed in a portrait orientation or a landscape orientation. Further, the content image has to be differently displayed in accordance with whether a user signs a contract to display a separate advertising image in the display apparatus 100 or not to display a separate advertising image in the display apparatus 100. Like this, in the layout information 323, it is designated what layout is used for displaying the content image in accordance with a user's contract content, the installed orientation of the display apparatus, or the like.

The server 200 retrieves the records 320 corresponding to the registered display apparatus 100 from the database 300, and provides the display apparatus 100 with contents customized based on the retrieved schedule information 321 and content address information 322. To register the display apparatus 100, the records 320 include a preset activation code 325, and validity check information 324 for checking validity of the activation code 325.

The activation code 325 includes a string of character or numerals, as a serial code arbitrarily generated by the service provider corresponding to the records 320 when the records 320 are generated. For example, the activation code 325 may include a numeral of seven digits. The activation code 325 serves as an index for specifying the records 320 in the database 300. For example, if the server 200 receives a certain activation code 325 from the exterior, the server 200 may retrieve the record 320 corresponding to the activation code 325 from the database 300.

The activation code 325 may be arbitrarily determined by the service provider when the records 320 is generated, but may be automatically generated by the server 200 itself. The server 200 may have various methods of generating the activation code 325. For example, the server 200 may use various functions such as a hash code or the like function to convert the customer information 310 or may use a random-number algorithm.

The validity check information 324 is information used as a criterion of checking the validity of the activation code 325 received by the server 200. The server 200 checks the validity of the activation code 325 based on the validity check information 324, and acquires information about the records 320 only if the validity of the activation code 325 is validated as a check result. The formats of the validity check information 324 and the method of checking the validity of the activation code 325 by the server 200 may be variously achieved, and details thereof will be described later.

The activation code 325 is achieved by the string of characters or numerals, which is simpler than a general input of identification (ID) and a password, and therefore easily input but relatively vulnerable in security. Thus, the validity check can compensate for the security vulnerability of the activation code 325.

As described above, the service provider constructs the database 300 in the server 200 based on the customer information 310 acquired from a user, but the server 200 does not provide the content data to the display apparatus 100 since the display apparatus 100 in this state is not registered to the server 200 yet.

In this state, the installation and operation of the display apparatus 100 will be described below.

The service provider notifies a user of the activation code 325. The notification may be variously achieved by e-mail, a text message service of a mobile phone, etc.

Figure 4:
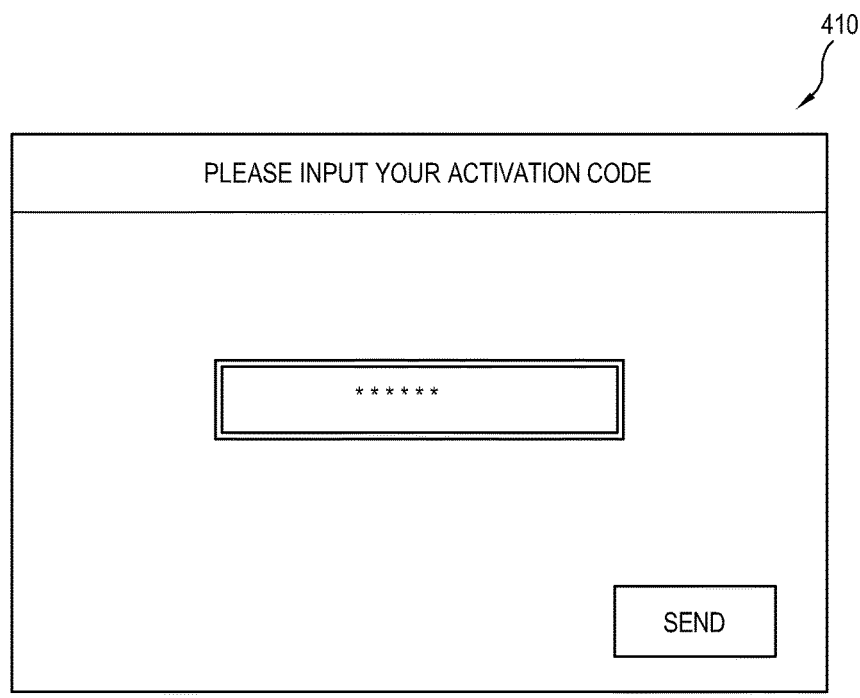
FIG. 4 shows an example of an input image for an activation code displayed in the display apparatus of FIG. 2.

FIG. 4 shows an example of an input image 410 for an activation code 325 displayed in the display apparatus 100.

A user receives the activation code 325, installs the display apparatus 100 at a desired place in a shop, and turns on the system.

The display apparatus 100 proceeds with an initial setting service for setting a use environment of the display apparatus 100, and performs network setting in the initial setting service, thereby accessing a network. The display apparatus 100 displays the input image 410 of the activation code 325 as shown in FIG. 4 when the initial setting service is finished.

Such display of the input image 410 may be performed by an executable code automatically executed when the initial setting service, in particular, the network setting is completed.

Below, the operations of registering the display apparatus 100 to the server 200, and providing the content data from the server 200 to the registered display apparatus 100 will be described.

Figure 5:
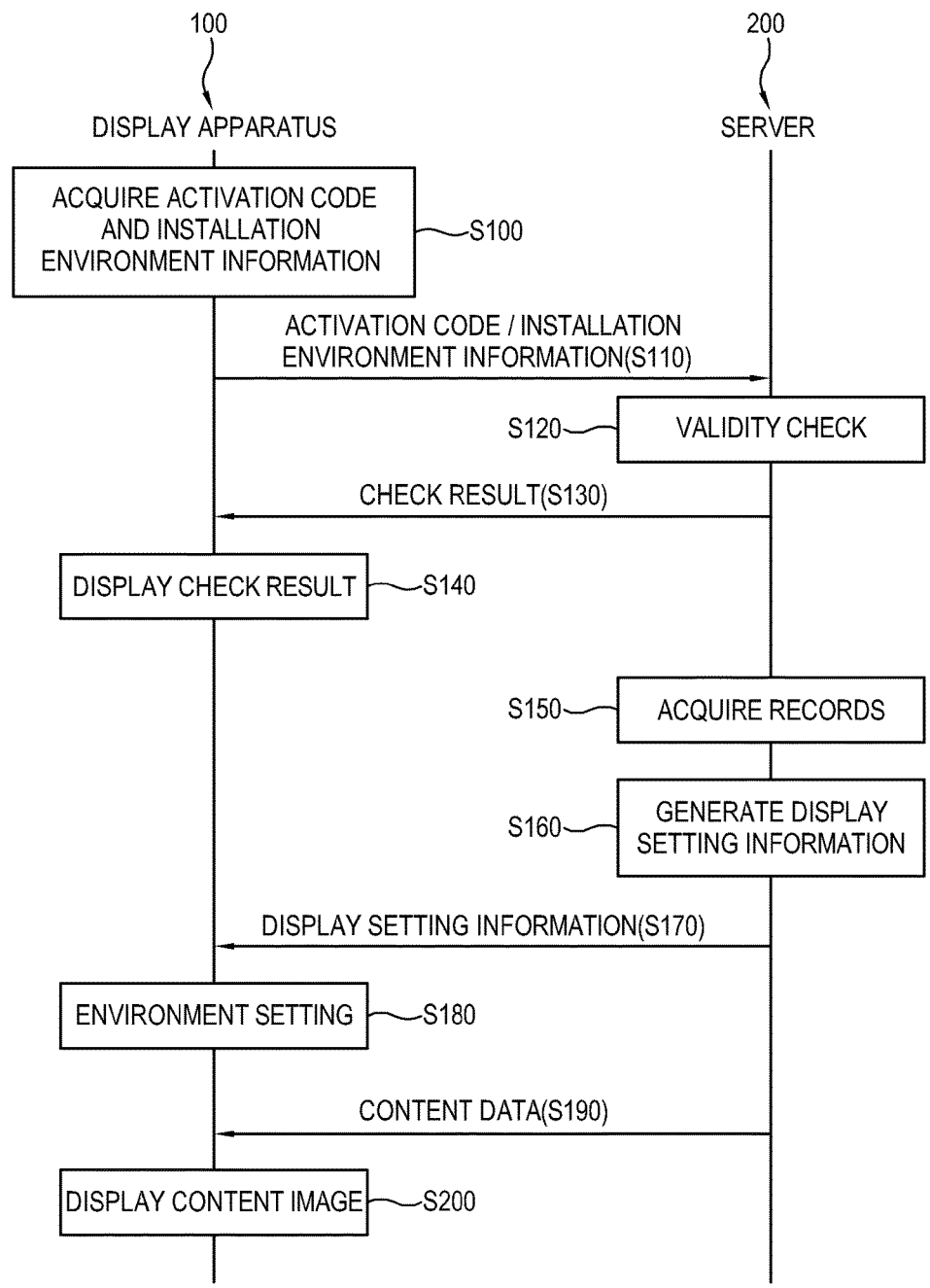
FIG. 5 shows an example of operations between the display apparatus and the server of FIG. 2.

FIG. 5 shows an example of operations between the display apparatus 100 and the server 200 of FIG. 2.

As shown in FIG. 5, at operation S100 the display apparatus 100 acquires the activation code 325 and installation environment information of the display apparatus 100. The activation code 325 is input by a user through the input image 410 of FIG. 4.

At operation S110 the display apparatus 100 transmits the activation code 325 and the installation environment information of the display apparatus 100 to the server 200 in order to register the display apparatus 100 to the server 200.

The installation environment information of the display apparatus 100 contains the installation position and installation layout of the display apparatus 100 acquired through the initial setting service, and information about a unique serial number and a media access control (MAC) address previously stored in the display apparatus 100. That is, the installation environment information of the display apparatus 100 is information that describes the current status of the display apparatus 100.

At operation S120 the server 200 performs the validity check with regard to the received activation code 325. The validity check is performed based on the validity check information 324 as previously described in FIG. 3.

At operation S130, the server 200 notifies the display apparatus 100 of a result from the validity check.

At operation S140, the display apparatus 100 displays the validity check result received from the server 200. The display apparatus 100 displays a message for informing that the display apparatus 100 is registered to the server 200 if the validity of the activation code 325 is validated, or displays an error message if the validity of the activation code 325 is not validated.

At operation S150, the server 200 acquires the records 320 corresponding to the activation code 325 the validity of which is validated.

At operation S160, the server 200 generates the customer information 310, or display setting information of the display apparatus 100 based on the installation environment information of the display apparatus 100 received together with the activation code 325. In addition, the server 200 may generate not only the display setting information in which settings for displaying the content image on the display apparatus 100 are designated, but also apparatus environment setting information that contains apparatus settings for designating settings about the other functions of the display apparatus 100 in addition to such display settings of the display apparatus 100.

At operation S170, the server 200 transmits the display setting information to the display apparatus 100.

At operation S180, the display apparatus 100 sets the environment of the display apparatus 100 in accordance with the display setting information.

The apparatus environment setting information containing the display settings and the apparatus settings is information in which the image display environment or apparatus status of the display apparatus 100 is set so that the display apparatus 100 can receive and display the content data from the server 200. For example, the layout information 323 in the records 320 includes two options of a layout template corresponding to a case where the display apparatus 100 is installed in the landscape orientation, and a layout template corresponding to a case where the display apparatus 100 is installed in the portrait orientation. The server 200 determines the layout of the display apparatus 100 based on the installation environment information of the display apparatus 100, and selects one of the two layout templates in accordance with a determination result, thereby sending the selected template to the display apparatus 100.

Alternatively, the server 200 may determine a rotated angle of the content image displayed on the display apparatus 100 based on the installation layout (landscape/portrait orientation) of the display apparatus 100, and send the determined rotated angle to the display apparatus 100.

Alternatively, the server 200 may determine a time zone of a region, in which the display apparatus 100 is installed, based on the installation environment information of the display apparatus 100, and send the setting information of the determined time zone to the display apparatus 100.

Alternatively, if the customer information 310 describes that a user signs a contract to display a separate advertising image, the server 200 may select a separate layout template for additionally displaying the advertising image and send the selected template to the display apparatus 100.

Alternatively, if the customer information 310 describes a restriction on displaying or processing an external input signal of the communicator 110 such as a universal serial bus (USB), the server 200 may send setting information for preventing or inactivating the display of the external input signal to the display apparatus 100.

In particular, the apparatus environment setting information may contain information for designating whether the display apparatus 100 is enabled or disabled to use an external source. For example, the apparatus environment setting information may be designated to inactivate an element through which the display apparatus 100 receives data from the external source, for example, the communicator 110 or the like connector (not shown), or to prevent data received in such an element from being transmitted to the processor 120 or the controller 160 that processes the corresponding data. If the apparatus environment setting information is designated as above, the display apparatus 100 is cut off from receiving an image signal from the external source or processing and displaying the image signal from the external source, in accordance with the designation of the apparatus environment setting information.

The external source refers to various environments connectable to the display apparatus 100 at the outside of the display apparatus 100. The external source may include an external device, a server or the like connected to the display apparatus 100 locally or through a network.

At operation S190, the server 200 sends the display apparatus 100 the content data in accordance with the schedule and layout designated in the records 320.

At operation S200, the display apparatus 100 displays the content image based on the content data received from the server 200.

Thus, the display apparatus 100 is easily registered to the server 200 by the activation code 325, and receive the content data from the server 200.

In the foregoing embodiment, the server 200 generates the apparatus environment setting information based on the installation environment information of the display apparatus 100 received together with the activation code 325 from the display apparatus 100. That is, the server 200 generates the apparatus environment setting information containing the display settings of the content image, based on the installation environment information of the display apparatus 100 received from the display apparatus 100, and returns the apparatus environment setting information to the display apparatus 100. However, the apparatus environment setting information is not limited to this exemplary embodiment. Alternatively, the server 200 may generate the apparatus environment setting information corresponding to the activation code 325.

In this alternative case, the display apparatus 100 transmits the activation code 325 to the server 200 without transmitting the installation environment information of the display apparatus 100. If the display setting information corresponding to the activation code 325 is previously stored in the server 200, the server 200 may select the display setting information corresponding to the activation code 325 and transmit the selected information to the display apparatus 100. If the display setting information received from the server 200 has a plurality of selectable options, the display apparatus 100 itself may select and apply one of the options based on the its own installation environment. On the other hand, if the display setting information corresponding to the activation code 325 has only one option, the server 200 may provide the display setting information corresponding to the activation code 325 to be directly applied to the display apparatus 100.

Figure 6:
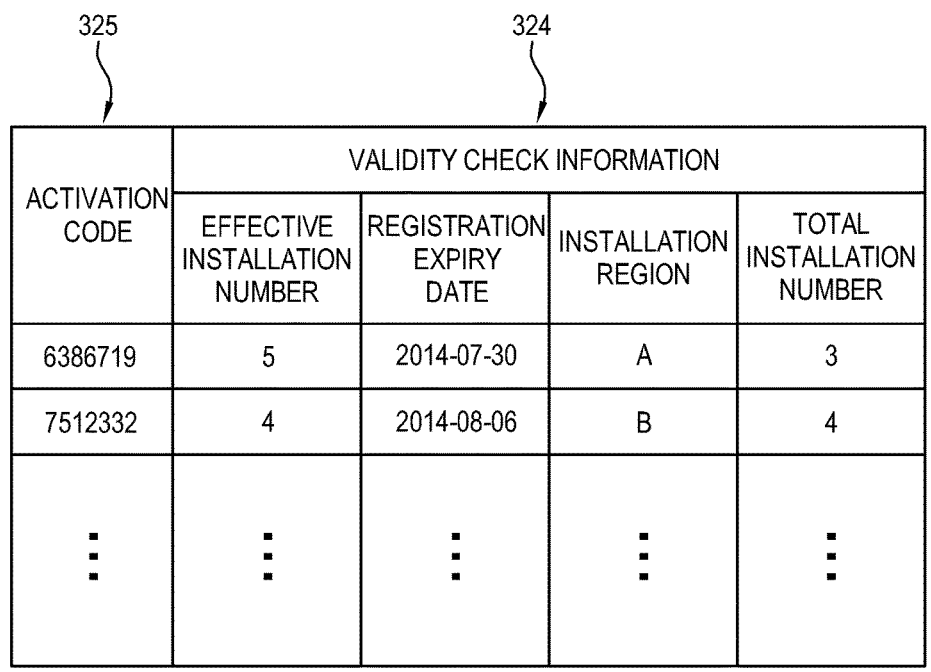
FIG. 6 shows an example of contents included in validity check information stored in the server of FIG. 6.

FIG. 6 shows an example of contents included in the validity check information 324 stored in the server of FIG. 6.

As shown in FIG. 6, a validity check method may be variously achieved in accordance with what information the validity check information 324 contains. In FIG. 6, the validity check information 324 contains items such as an effective installation number, a registration expiry date, an installation region, a total installation number, etc., but some items may be excluded or added in accordance with the validity check methods. That is, plurality of check criterions applied to the validity check method may be overlapped.

As one example of the validity check methods, if the validity check information 324 contains information related to a registration restrictive condition of the activation code 325, the server 200 determines that the activation code 325 is effective if the activation code 325 does not violate the registration restrictive condition. The registration restrictive condition designates the effective installation number of display apparatus 100, the registration expiry date of the display apparatus 100, etc.

In the registration restrictive condition, the effective installation number of the display apparatus 100 means an installable number of display apparatuses 100 registered with the same activation code 325. When a user makes a purchase of the license from the service provider, s/he signs a contract to install how many display apparatus 100 will be installed in a shop and receive the content data, and the effective installation number of the display apparatus 100 is contained in the customer information 310.

The server 200 receives the respective activation codes 325 from the plurality of display apparatuses 100 and counts up the activation codes 325, thereby recording the counted number as the total installation number. If the server 200 receives the activation code 325 from another display apparatus 100 while exceeding the effective installation number, the server 200 determines that the corresponding activation code 325 is not valid.

For example, in the activation code 325 of "6386719", the effective installation number is 5 but the number of display apparatuses 100 already registered with this activation code 325 is 3. In this case, it is determined that this activation code 325 is valid. On the other hand, in the activation code 325 of "7512332", the effective installation number is 4 and the number of display apparatuses 100 already registered with this activation code 325 is 4. In this case, it is determined that this activation code 325 is invalid. That is, it is impossible to use the activation code 325 of "7512332" to additionally register the display apparatus 100.

In the registration restrictive condition, the registration expiry date of the display apparatus 100 refers to a date by which the activation code 325 is valid to register the display apparatus 100 to the server 200. The server 200 determines that the activation code 325 is invalid if the activation code 325 is received after the expiry date designated in the validity check information 324.

For example, the activation code 325 of "6386719" has a registration expiry date of Jul. 30, 2014, and the activation code 325 of "7512332" has a registration expiry date of Aug. 6, 2014. If the server 200 receives the activation code 325 on Aug. 1, 2014, the server 200 determines that "7512332" is valid and "6386719" is invalid.

As another example of the validity check methods, if the validity check information 324 contains information related to an installation region of the display apparatus 100, the server 200 determines that the installation region of the display apparatus 100 based on the installation environment information of the display apparatus 100 received together with the activation code 325. Further, the server 200 determines the activation code 325 is valid if the determined installation region is the same as the installation region designated in the validity check information 324, and determines the activation code 325 is invalid if the determined installation region is different from the installation region designated in the validity check information 324.

For example, the activation code 325 of "6386719" corresponds to an installation region of A. If the installation region of the display apparatus 100 specified by the installation environment information of the display apparatus 100 received together with the activation code 325 is A, the server 200 determines that the activation code 325 is valid. On the other hand, if the specified installation region of the display apparatus 100 is not A, the server 200 determines that the activation code 325 is invalid.

Below, an embodiment of displaying a content image differently in accordance with the installation layout of the display apparatus 100 in the case where the plurality of display apparatuses 100 are registered with the same activation code 325 will be described with reference to FIG. 7 and FIG. 8.

Figure 7:
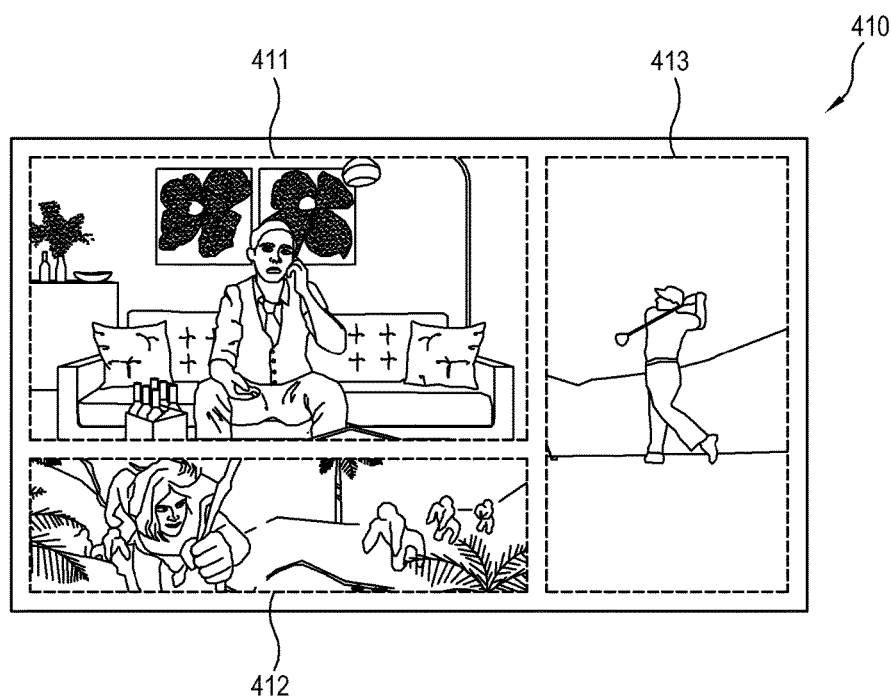
FIG. 7 shows an example of displaying a content image in the state that the display apparatus of FIG. 2 is installed in a landscape orientation.
Figure 8:
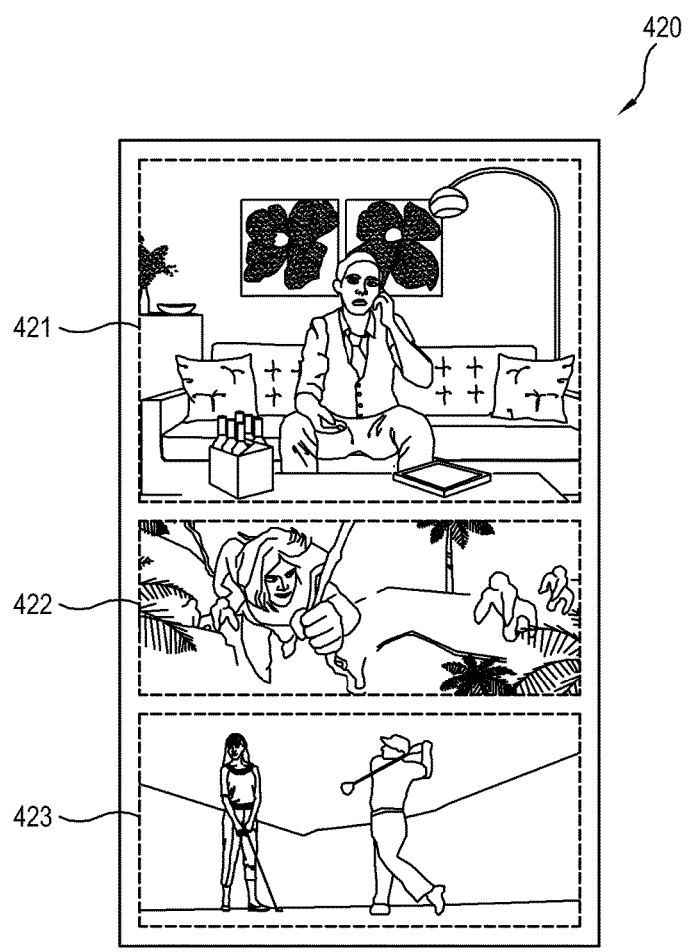
FIG. 8 shows an example of displaying a content image in the state that the display apparatus of FIG. 2 is installed in a portrait orientation.

FIG. 7 shows an example of displaying a content image in the state that the display apparatus 100 is installed in the landscape orientation, and FIG. 8 shows an example of displaying a content image in the state that the display apparatus 100 is installed in the portrait orientation.

The layout information 323 of the records 320 describes what layout the display apparatus 100 for displaying the content image has. The server 200 determines the installation layout of the display apparatus 100 based on the installation environment information received from the display apparatus 100, and selects a layout template corresponding to the determination result among a plurality of layout templates defined in the layout information 323, thereby sending the selected layout template to the display apparatus 100. Thus, the display apparatus 100 displays the content image by reflecting the layout template received from the server 200.

As shown in FIG. 7, if the display apparatus 100 is installed in the landscape orientation, a content image 410 including a first image 411 showing a menu, a second image 412 showing additional information and a third image 413 showing an advertisement is horizontally displayed in the landscape orientation in accordance with the installation layout of the display apparatus 100. For example, the third image 413 is arranged at the right side of the first image 411 and the second image 412.

As shown in FIG. 8, if the display apparatus 100 is installed in the portrait orientation, a content image 420 including a first image 421 showing a menu, a second image 422 showing additional information and a third image 423 showing an advertisement is vertically displayed in the portrait orientation in accordance with the installation layout of the display apparatus 100. For example, the third image 423 is arranged at the bottom side of the first image 421 and the second image 422.

Like this, the display method of the content image is varied depending on the installation layouts of the display apparatuses 100 even though two display apparatuses 100 are registered to the server 200 by the same activation code 325 and also receive and display the same content data from the server 200. The display method of the display apparatus 100 is designated by the server 200, and the server 200 determines the display method of the display apparatus 100 based on the installation environment information received together with the activation code 325 from the display apparatus 100.

Below, a control method of the server 200 will be described with reference to FIG. 9.

Figure 9:
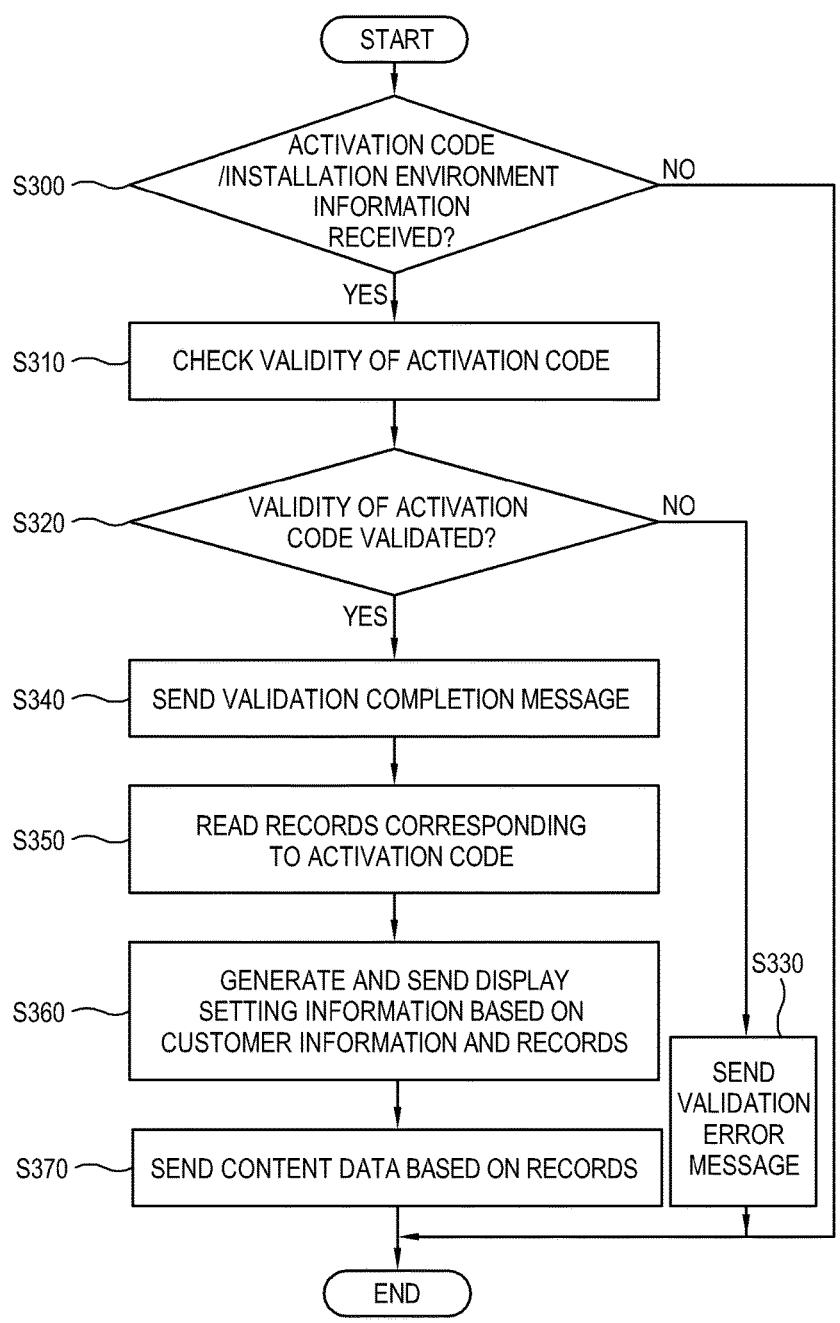
FIG. 9 is a flowchart of controlling the server of FIG. 2.

FIG. 9 is a flowchart of controlling the server 200.

As shown in FIG. 9, at operation S300, the server 200 determines whether the activation code 325 from the display apparatus 100 and the installation environment information of the corresponding display apparatus 100 are received. If the activation code 325 and the installation environment information are received, the server 200 enters operation S310.

In the operation S310, the server 200 checks the validity of the activation code 325 if the activation code 325 is retrieved in the database 300. At operation S320, the server 200 determines whether the validity of the activation code 325 is validated based on the validity check. The server 200 enters operation S330 if the validity of the activation code 325 is not validated, but enters operation S340 if the validity of the activation code 325 is validated.

In the operation S330, the server 200 sends a validation error message to the display apparatus 100, and monitors whether a new activation code 325 is received.

In the operation S340, the server 200 sends a validation completion message to the display apparatus 100. At operation S350, the server 200 reads the records 320 corresponding to the validated activation code 325, i.e., the schedule information 321, the content address information 322, the layout information 323, etc. At operation S360, the server 200 generates the display setting information of the display apparatus 100 based on the customer information 310 and the records 320, and sends the generated display setting information to the display apparatus 100.

At operation S370, the server 200 sends the content data to the display apparatus 100 in accordance with the read records 320.

Below, a control method of the display apparatus 100 will be described with reference to FIG. 10 and FIG. 11.

Figure 10:
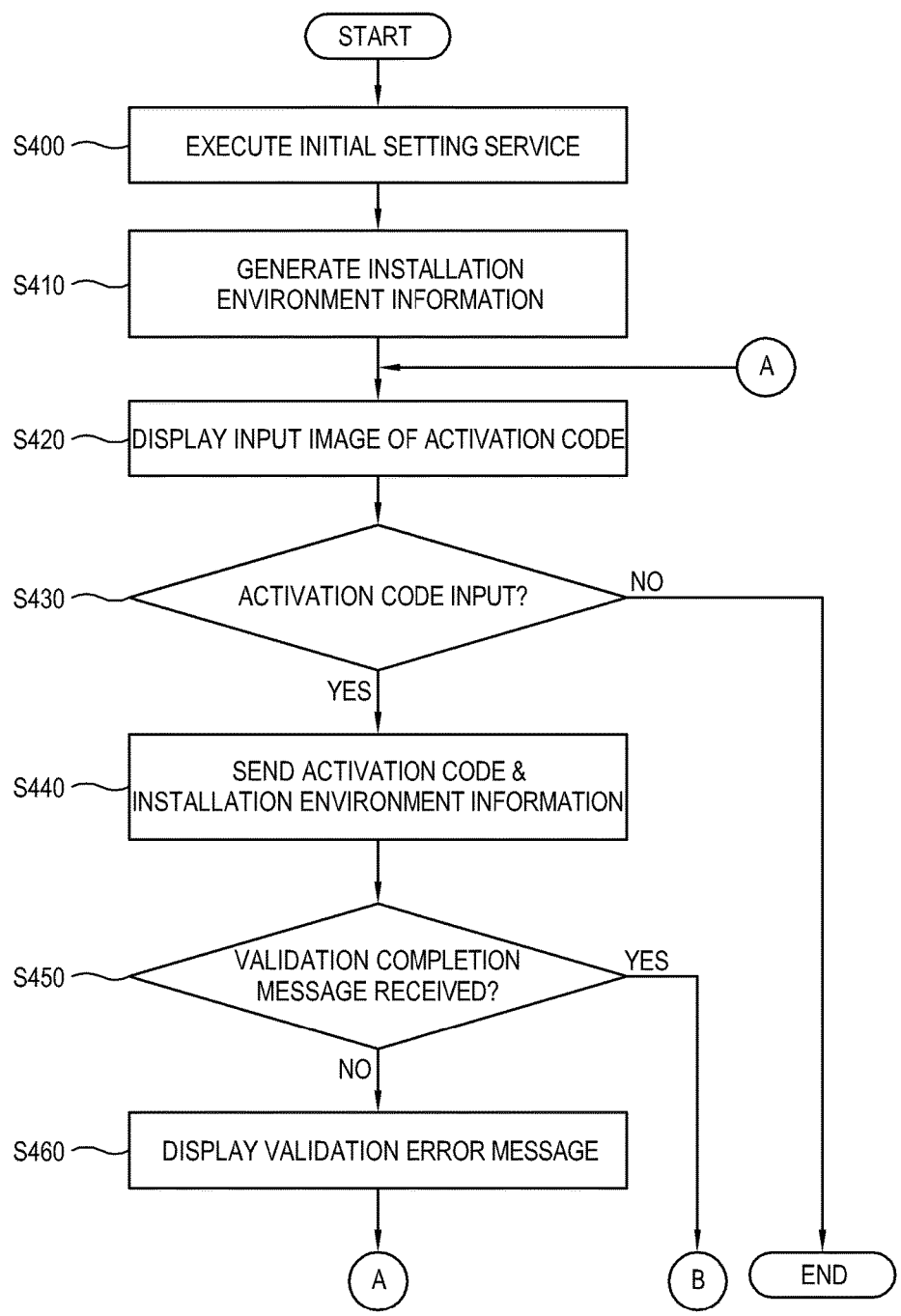
FIGS. 10 and 11 are flowcharts of controlling the display apparatus of FIG. 2.
Figure 11:
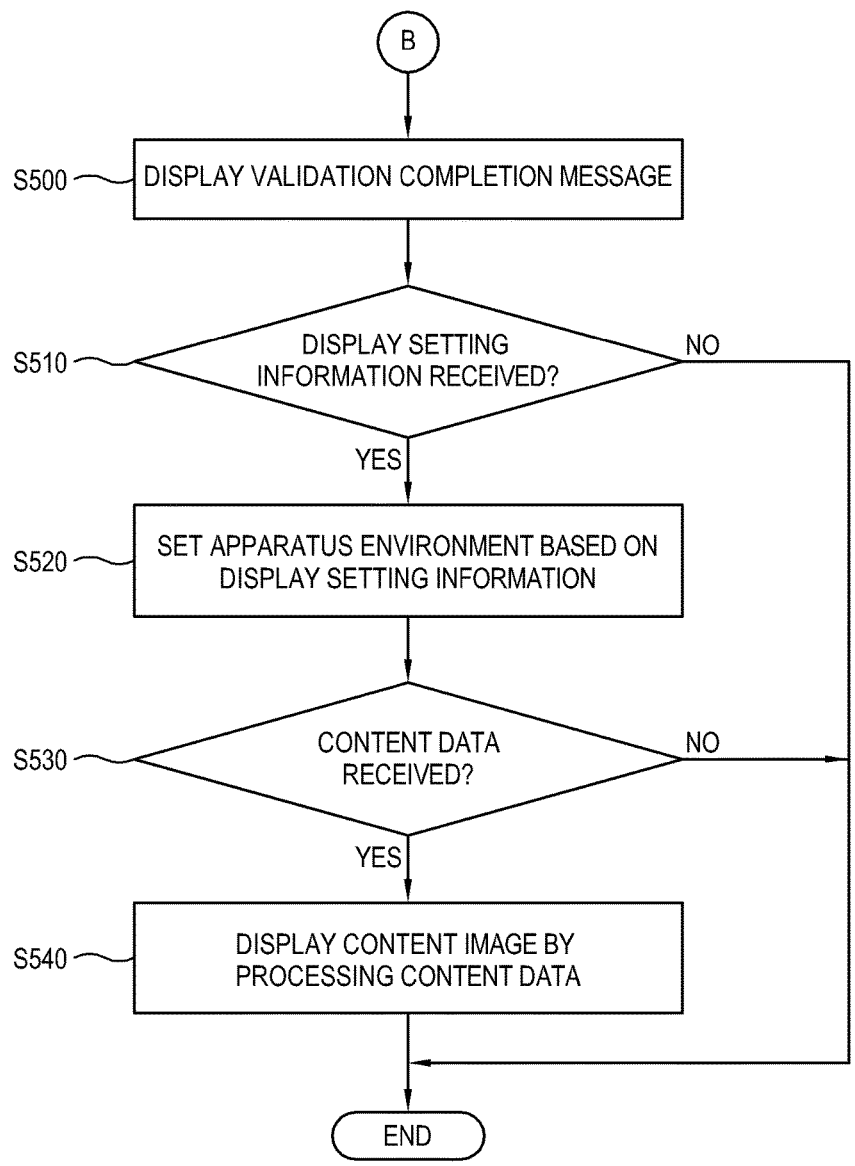

FIGS. 10 and 11 are flowcharts of controlling the display apparatus 100.

As shown in FIG. 10, at operation S400 the display apparatus 100 executes the initial setting service if the system is first turned on. At operation S410, the display apparatus 100 generates the installation environment information of the display apparatus 100 in accordance with the initial setting service. At operation S420, the display apparatus 100 displays the input image of the activation code 325.

At operation S430, the display apparatus 100 determines whether the activation code 325 is input. When the activation code 325 is input, the display apparatus 100 enters operation S440.

In the operation S440, the display apparatus 100 sends the activation code 325 and the installation environment information to the server 200.

At operation S450, the display apparatus 100 determines whether a message received from the server 200 is a validation completion message or a validation error message after sending the activation code 325. The display apparatus 100 enters operation S460 if the validation error message is received, or enters operation S500 of FIG. 11 if the validation completion message is received.

In the operation S460, the display apparatus 100 displays the validation error message. Then, the display apparatus 100 returns to the operation S420 so that a user can input the activation code 325 again.

As shown in FIG. 11, in the operation S500, the display apparatus 100 displays the validation completion message. At operation S510, the display apparatus 100 determines whether display setting information is received from the server 200. If the display setting information is received, the display apparatus 100 enters operation S520.

In the operation S520, the display apparatus 100 sets the apparatus environment of the display apparatus 100 in accordance with the display setting information. At operation S530, the display apparatus 100 determines whether content data is received from the server 200. If the content data is received, the display apparatus 100 enters operation S540.

In the operation S540, the display apparatus 100 processes the content data and displays a content image based on the content data.

The few exemplary embodiments have to be considered as illustrative only not limited to these exemplary embodiments, and it will be appreciated by those skilled in the art that changes may be made in these exemplary embodiments without departing from the principles and spirit of the invention, the scope of which is defined in the appended claims and their equivalents.

The invention claimed is:

1. A display apparatus comprising:
  a display;
  a communicator configured to communicate with a server; and
  a processor configured to:
    control the display to display a user interface (UI),
    control the communicator to transmit an activation code input through the UI to the server, wherein the activation code is configured to correspond to a user, and
    control the communicator to receive layout information and a plurality of content images corresponding to the user identified by the activation code from the server, wherein the received layout information is configured to indicate locations where the plurality of content images are respectively displayed on the display of the display apparatus, and
    control the display to display the plurality of content images respectively arranged on the display based on the received layout information.

2. The display apparatus according to claim 1, wherein the processor is configured to control receiving the plurality of content images provided corresponding to the user of the display apparatus which is registered to the server.

3. The display apparatus according to claim 2, wherein the plurality of content images is transmitted from the server in accordance with schedule information for designating a time zone when the plurality of content images is provided to the display apparatus.

4. The display apparatus according to claim 2, wherein the layout information comprises a plurality of templates for designating a layout of displaying and arranging the plurality of content images respectively.

5. The display apparatus according to claim 4, wherein the processor is configured to control transmitting installation environment information about an installation environment of the display apparatus together with the activation code to the server for enabling the server to select one of a plurality of templates based on the installation environment of the display apparatus, and control displaying the plurality of content images based on the selected template.

6. The display apparatus according to claim 2, wherein a registration of the display apparatus to the server is based on validating the activation code against validity check information.

7. The display apparatus according to claim 6, wherein the activation code is validated based on a registrable number of display apparatuses using the activation code not exceeding a preset value.

8. The display apparatus according to claim 6, wherein the activation code is validated based on a point of time of receiving the activation code in the server not having passed a preset date.

9. The display apparatus according to claim 6, wherein the activation code is validated based on an installation region of the display apparatus sending the activation code being the same as a preset region.

10. The display apparatus according to claim 1, wherein the processor is configured to control receiving an apparatus setting of the display apparatus designated based on an installation environment from the server by controlling transmitting of installation environment information about the installation environment of the display apparatus together with the activation code to the server, and controlling display of the content image based on the received apparatus setting.

11. The display apparatus according to claim 10, wherein the installation environment information comprises an installation position and an installation layout of the display apparatus.

12. The display apparatus according to claim 10, wherein the apparatus setting of display apparatus comprises at least one of a time zone of an installation region of the display apparatus, information about whether to additionally display an advertising image, information whether to cut off the display apparatus from displaying an external input signal, and a rotated angle of the content image.

13. The display apparatus according to claim 10, wherein the processor is configured to control an initial setting service for setting a use environment of the display apparatus when the display apparatus is first turned on, and acquire the installation environment information in accordance with the initial setting service.

14. A method of controlling a display apparatus, the method comprising:
   controlling, by a processor, to communicate with a server;
   controlling, by the processor, to display a user interface (UI);
   controlling, by the processor, to transmit an activation code input through the UI to the server, wherein the activation code is configured to correspond to a user;
   controlling, by the processor, to receive layout information and a plurality of content images corresponding to the user identified by the activation code from the server, wherein the received layout information is configured to indicate locations where the plurality of content image are respectively displayed on a display of the display apparatus; and
   controlling, by the processor, to display the plurality of content images respectively arranged on the display based on the received layout information.

* * * * *